United States Patent
Lee et al.

(10) Patent No.: US 6,879,594 B1
(45) Date of Patent: Apr. 12, 2005

(54) SYSTEM AND METHOD FOR LOOP AVOIDANCE IN MULTI-PROTOCOL LABEL SWITCHING

(75) Inventors: Cheng-Yin Lee, Ottawa (CA); Loa Andersson, Slus (SE)

(73) Assignee: Nortel Networks Limited, Montreal (CA)

(*) Notice: Subject to any disclaimer, the term of this patent is extended or adjusted under 35 U.S.C. 154(b) by 707 days.

(21) Appl. No.: 09/588,533

(22) Filed: Jun. 7, 2000

Related U.S. Application Data (60) Provisional application No. 60/137,717, filed on Jun. 7, 1999.

(51) Int. Cl.[7] .............................................. H04L 12/28
(52) U.S. Cl. ...................................... 370/408; 370/389
(58) Field of Search .............................. 370/256, 395.1, 370/396, 395.52, 400, 406, 408; 709/242, 252

(56) References Cited

U.S. PATENT DOCUMENTS

| | | |
|---|---|---|
| 4,740,954 A | 4/1988 | Cotton et al. |
| 5,878,232 A | 3/1999 | Marimuthu |
| 5,905,871 A | 5/1999 | Buskins et al. |
| 6,032,194 A | 2/2000 | Gai et al. |
| 6,205,488 B1 * | 3/2001 | Casey et al. ................. 709/238 |
| 6,236,657 B1 * | 5/2001 | Andersson et al. .......... 370/400 |
| 6,374,303 B1 * | 4/2002 | Armitage et al. ............ 709/242 |
| 6,452,942 B1 * | 9/2002 | Lemieux ...................... 370/468 |
| 6,501,754 B1 * | 12/2002 | Ohba et al. .................. 370/389 |

OTHER PUBLICATIONS

Ohba, et al.: "MPLS Loop prevention Mechanism" 'Online!, May 1999, IETF, Internet XP002161484, p. 1, line 28–line 38; p. 29, paragraphs A.1–A.2; and p. 30.

Anderson, et al.: "LDP Specification" 'Online!, May 1999, IETF, Internet XP002161485, p. 1, line 31; p. 2 line 4, p. 24, paragraph 2.8; and p. 27, paragraph 2.8.2.

* cited by examiner

Primary Examiner—Huy D. Vu
Assistant Examiner—Toan Nguyen
(74) Attorney, Agent, or Firm—Katten Muchin Zavis Rosenman (57) ABSTRACT

A method for avoiding loops from forming when setting up label switched paths is provided. The method uses a Label Splicing Message is followed by an Acknowledgment message to determine if loops are formed in the process of joining a new node or subtree to a multicast MPLS tree. By verifying that the path towards the root of the MPLS tree is loop-free during the construction of the tree, this method complements the loop detection mechanism provided by the label switched protocol (LDP).

20 Claims, 5 Drawing Sheets

SYSTEM AND METHOD FOR LOOP AVOIDANCE IN MULTI-PROTOCOL LABEL SWITCHING

This application claims the benefit of provisional patent application No. 60/137,717, filed Jun. 7, 1999.

BACKGROUND OF THE INVENTION

1. Field of Invention

The present invention relates in general to digital communication methods and systems, and in particular to a system and method for preventing the formation of loops in label switched paths in a multi-protocol label switching (MPLS) communications environment.

2. Related Art

A host node initiating a transmission of a data packet to another node in the network is called the source node. The host node which receives the data packet is called the destination node. A host node may initiate transmission or receive data, whereas a router can only receive and retransmit data. Establishing communications between a single source node and a single destination node is achieved through a process called unicast routing.

Multicasting is defined as a communications process involving one or more senders and receivers. Information transmitted by any participant in the multicast is received by every other participant in the multicast. Users connected to the network who are not participants in a particular multicast do not receive the information transmitted by any of the senders and no network components, e.g. switches or trunks, are used unless needed for the multicast. For example, broadcast involving one sender and many receivers is a particular case of multicasting and may include wide-area broadcast, e.g. TV and radio, narrowcast for smaller areas, and conferencing with selected numbers of transmitters and receivers across a wide area.

For performing a multicast conversation in a network, the switches elect a single switch among all the switches within each network to be the "root" switch. Each switch has a unique identifier (switch ID) and the root may be be the switch having the lowest switch ID. At each switch, a "root port" which gives the fewest number of hops from this switch to the root is selected, while ports not included within the spanning tree are blocked. At the root, all ports are placed in the forwarding state. For each LAN coupled to more than one switch, a "designated" switch, typically the one closest to the root, is elected to ensure connectivity to all LANS.

A standard spanning tree procedure has been defined for network bridging devices (bridges, routers, switches) to enable these devices to discover a subset of any topology that forms a loop-free (i.e. tree) and yet connects every pair of local area networks (LANs) within the network (i.e. spanning). The spanning tree procedure results in a network path between any two bridging devices which is updated dynamically in response to network modifications. For example, switches exchange configuration messages called bridge protocol data units (BPDUs) frames, which allow them to calculate the active topology, or the spanning tree by blocking all redundant links and leaving a single communications path.

A plurality of switches interconnected by trunks may be arranged to form a spanning tree (MDT) or a multicast distribution tree. If host nodes A and B wish to set up a multicast transmission using a previously agreed multicast address "M", a control packet containing source address "A" and destination address "M" is transmitted in the network. Entries are added at each switch where the control packet arrives and then deleted after the defined time interval (MaxTime) if the entries are not reinforced from hosts A and B. When another host wants to join a multicast transmission, even if it is the first participant, it simply transmits a JOIN request control packet from itself to the "M" address. The JOIN request is broadcasted over the entire spanning tree and the joining host continues to send packets to the "M" address with a maximum inter-packet time interval smaller than MaxTime to make sure that at least one of the relevant table entires is not cleared.

A new branch in a multicast distribution tree (MDT) tree is formed by transmitting a JOIN REQUEST control packet from a node, or a subtree that wishes to join the group. The multicast tree sends back a JOIN ACKNOWLEDGMENT (JOIN-Ack) control packet in the opposite direction. It is possible to transmit only the JOIN request and each node not already in the multicast tree which receives the JOIN request is directly attached to the tree. However, the use of JOIN-Ack provides some ability to prevent loops from occurring.

A loop is a circular path which causes a packet to return to originating node on the same path the packet was transmitted. The existence of redundant communications paths, especially in meshed networks, may cause the undesirable formation of "loops" resulting in proliferation of data frames along loops. As well, the expansion of networks often results in loops that cause undesired duplication and transmission of network packets, such as broadcast storm as well as address conflict problems.

When a node attempts to re-join the group, the node generates a JOIN request control packet with a set active flag and a set re-join flag. When this packet is received at a member node, the receiving node clears the active flag and transmits a JOIN-Ack back to the node which generated the JOIN request, and retransmits copies of the JOIN request to each member node. Member nodes receiving the copy of the JOIN request control message retransmit copies of the received JOIN request to other member nodes, except the node from which the packet was received.

If the JOIN request control packet returns to the originating node wishing to re-join, then a loop exists and includes only member nodes. The originating node has to transmit a QUIT request control packet, and reattempt to join after a preset waiting period.

It is desired to detect problematic links or loops that can cause problems and undermine the purpose of the spanning tree. Generally, most unicast algorithms provide for loop prevention when forming unicast routing paths between each node and storing these paths in the forwarding tables. When a loop is created, the unicast algorithms detects and removes such loop by revising the paths contained in these loops. Even transient loops can disrupt the construction of the multicast distribution tree (MDT).

As internet communications increase, it has become apparent that competing network layer protocols, such as the Internet Protocol (IP), Asynchronous Transfer Mode (ATM) and Frame Relay (FR), need to interoperate to forward packets. The Multi-Protocol Label Switching (MPLS) has been developed to work with any network layer protocol.

Under a conventional connectionless network layer protocol such as IP, a data packet is forwarded from one router to another as the data packet travels from its start to its destination. As the data packet is forwarded, each router makes an independent forwarding decision for that data packet by analyzing the packet's header and running a network layer routing algorithm. Each router then independently chooses a next hop for the data packet, based on its analysis of the packet's header and the results of the running routing algorithm. To choose the next hop for a data packet Involves two steps. The data packets are first partitioned into forwarding equivalence classes (FECs). Secondly, each forwarding equivalence class is mapped to a next hop.

As far as the forwarding decision is concerned, different data packets that are partitioned into the same FEC are indistinguishable, and all data packets that belong to a particular FEC and traveling from a node, follow the same path (or one of the set of paths) associated with this particular forwarding equivalence class (FEC).

A typical router considers two data packets to be in the same forwarding equivalence class (FEC) if there is an address prefix in that router's routing tables that is the longest match for each data packet's destination address. As the data packet traverses the network, each hop in turn reexamines the packet and assigns it to a forwarding equivalence class (FEC).

By contrast, in multi-protocol label switching MPLS the assignment of a data packet to a particular forwarding equivalence class (FEC) is done just once when the packet enters the network. The FEC to which the data packet is assigned is encoded as a short, fixed length value known as label.

When a data packet is forwarded to its next hop, the label is sent along with it. Thus, the packets are "labeled" before they are forwarded. At subsequent hops, there is no further analysis of the packet's network layer header. Instead, the label is used as an index into a table that specifies the next hop, and the new label to be assigned. The old label is replaced with the new label, and the packet is forwarded to the next hop. A router that supports multi-protocol label switching is known as a label switching router (LSR).

The multi-protocol label switching (MPLS) has a number of advantages over conventional network layer forwarding protocols. First, MPLS forwarding can be done by switches that are capable of doing label lookup and label replacement, but are either not capable of analyzing the network layer headers, or are not capable of analyzing the network layer headers at adequate speed.

Secondly, since a data packet is assigned to a FEC when it enters the network, an ingress router can use any information it has about the packet to determine the assignment, even if that information can not be determined from the network layer header. For example, data packets arriving on different ports can be assigned to different forwarding equivalence classes (FECs).

In MPLS, a data packet that enters the network at a particular router can be labelled differently than the same packet entering the network at a different router. As a result, forwarding decisions that depend on the ingress router can be easily made. This functionality can not be achieved with conventional forwarding, since the identity of a data packet's ingress router does not travel with the packet. (Conventional forwarding can only consider information that travels with the packet in the packet header).

Finally, for purposes of traffic engineering, it is sometimes desirable to force a packet to follow a constraint route which may be explicitly chosen at or before the time the packet enters the network. In conventional forwarding, this requires that the packet carry a source routing. In MPLS, a label can be used to represent the route, so that the identity of the explicit route need not be earned with the packet.

A disadvantage of the MPLS is the possible creation of loops, due to independent labeling decisions made at each router. Loops can cause severe degradation of a label switched router (LSR) overall performance. Generally, loop detection procedures are used to eliminate looping label switched paths in MPLS.

One method of loop detection in multi-protocol label switching uses the time-to-live (TTL) value carried in a packets header. In conventional IP forwarding, each packet carries a TTL value in its header. Whenever a packet passes through a router, its TTL is decremented by 1. If the TTL reaches 0 before the packet has reached its destination, the packet is discarded. This provides some level of protection against forwarding loops that may exist due to misconfigurations, or due to failures, or the slow convergence of a routing algorithm. However, certain communication systems are unable to support a TTL function. For example, ATM switching hardware can not decrement TTL, thus there is no protection against looping packets.

Since there is no explicit loop avoidance mechanism in the current MPLS—label distribution protocol (LDP), data may be already looping before the loops are detected. Loops are always undesirable, and more so on a multicast distribution tree. In particular, loops in a multicast point to multipoint (p2 mp) tree are harmful, as the packets are replicated and in the event of loops, multiple copies are generated at each loop. Multicast routing loops can affect a large number of nodes in a network in a short period of time and need to be detected, and ideally prevented before network failure or a long lasting damage occur.

One method of loop avoidance has been proposed in Y. Ohba, Y. Katsube, E. Rosen, P. Doolan, "MPLS Loop Prevention Mechanism", October 1999, an IETF Internet-Draft that can be found at "draft-ietf mpis-loop-prevention-02.tx". Ohba et al. present a mechanism, based on "threads", that can be used to prevent MPLS from setting up label switched paths that contain loops. When a label switched router (LSR) finds that the next hop for a particular FEC has changed, it creates a thread and extends it downstream. Each such thread is assigned a unique "color", such that no two threads in the network can have the same color. For a given label switched path, once a thread is extended to a particular next hop, no other thread is extended to that next hop, unless there is a change in the hop count from the furthest upstream node.

The only state information that needs to be associated with the next hop for a particular label switched path is the thread color, and the hop count. If there is a loop, then some thread will arrive back at an label switched router (LSR) through which it has already passed. Such an event will be detected, since each thread has a unique color.

However, the proposed colored thread method of loop prevention has certain disadvantages. In particular, this method requires additional information especially the color to be added to the label which increases the size of each packet. Further, the loop prevention mechanism proposed by Ohba et al. does not separate the function of loop prevention from the label request message looping prevention, nor the label mapping from the label splicing function.

It is, therefore, desirable to provide method and system for preventing the creation of looping label switched paths in a MPLS environment that is reliable and requires a low router overhead.

SUMMARY OF THE INVENTION

The present invention seeks to overcome the disadvantages of the prior art associated with loop avoidance in a MPLS environment.

In a first aspect, the present invention provides a method for preventing a looping label switched path in a multi-protocol label switching (MPLS) environment. A label switching router (LSR) on a label switched path of a MPLS tree determines that a forwarding equivalence class (FEC) requires mapping and that there exists a previous binding for this particular FEC. The label switching router (LSR) then sends a label splice message (Lsm) to the root of the MPLS tree. If the Lsm is received at the root, a label splice message acknowledgment (Lsm-Ack) for the respective forwarding equivalence class (FEC) is returned to the LSR. When the Lsm-Ack is received at the LSR, the label is mapped for the respective FEC.

The present is not limited to the features disclosed in the "Summary of the Invention" section; it nonetheless may reside on sub-combinations of the disclosed features.

BRIEF DESCRIPTION OF THE DRAWINGS

Preferred embodiments of the present Invention will now be described, by way of example only, with reference to the attached Figures, wherein:

FIG. 4 illustrates the grafting of a node to a MPLS trees a

Similar references are used in different figures to denote similar components.

DETAILED DESCRIPTION OF THE INVENTION

The following description relates to preferred embodiments of the invention by way of example only and without limitation to the combination of features necessary for carrying the invention into effect.

The present invention is directed to a method and system to avoid routing loops when setting up label switched paths, by verifying that the path towards the root of a MPLS tree is loop free before a node is grafted to the tree. The present invention is applicable to both unicast and multicast label path setup, and is intended to complement the loop detection mechanism available for example in MPLS-LDP. The method according to the invention, may be used with ATM-label switching and FR-label switching router networks, or any other networks where multicast label switching is supported.

Figure 1:
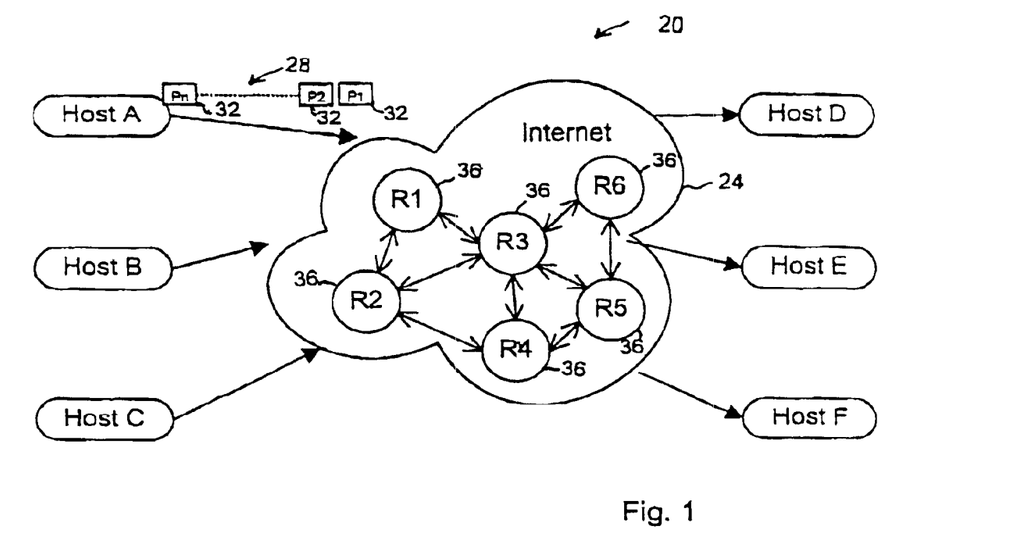
FIG. 1 is a block diagram of a network communications system.

A system according to the present invention is shown in FIG. 1 and generally designated at 20. In this example, system 20 consists of host nodes A, B, C, D, E and F interconnected through a multi-protocol label switching (MPLS) network 24. To communicate and share information, host nodes A and D, for example, pass messages, in the form of a digital byte stream 28, through network 24. Byte stream 28 is broken into data packets 32. To ensure that data packets 32 are correctly and efficiently routed from host A to host D, they are typically routed through one or more label switching routers (LSRs) 36. LSRs 36 can operate with various network protocols, such as Internet Protocol (IP), Asynchronous Transfer Mode (ATM) and Frame Relay (FR).

In system 20, a short, fixed length, locally significant identifier, known as a label, is attached to each packet 32 to identify its FEC. Most commonly, a data packet 32 is assigned to a FEC based on its destination address.

A "labeled packet" is a packet into which a label has been encoded. In some cases, the label resides in an encapsulation header which exists specifically for this purpose. In other cases, the label may reside in an existing data link, or network layer header as long as there is a field which is made available for that purpose. The particular encoding technique to be used must be agreed to by both the entity which encodes the label and the entity which decodes the label.

In MPLS networks, data flows from an upstream node, or LSR-Ru, to a downstream node, or LSR-Rd. When Ru transmits a data packet to Rd, Ru labels the packet with "L" if the packet is a member of a particular FEC "F". That is, they can agree to a "binding" between the label "L" and the forwarding equivalence class "F" for packets moving from Ru to Rd.

In this way, "L" becomes Ru's outgoing label representing the forwarding equivalence class "F", and "L" also becomes Rd's incoming label representing the forwarding equivalence class "F". ("L" represents the forwarding equivalence class "F" for data packets sent from Ru to Rd, and is an arbitrary value whose binding to "F", is local to Ru and Rd).

In the MPLS architecture, the decision to bind a particular label "L" to a particular forwarding equivalence class (FEC) "F" is made by the label switching router (LSR) which is downstream (Rd) with respect to the binding. The downstream label switching router (Rd) informs the upstream label switching router (Ru) of the binding. Thus labels are downstream-assigned, and label bindings are distributed in the downstream to upstream direction. For example, upstream router Ru can request (using a label request message), a label to be used when forwarding packets of a particular forwarding equivalence class (FEC). Downstream router Rd then informs, the upstream router Ru (via a label mapping), what label it should use. It is to be noted that Rd may distribute such a label to Ru without any prompting, e.g. without a label request from Ru.

A label switching router (LSR) informs other LSRs about the existing label/forwarding equivalence class (FEC) bindings created by the label distribution protocol (LDP). A number of different label distribution protocols (LDPs) are presently being standardized, including MPLS-BGP (reservations protocol), MPLS-RSVP MPLS-RSVP-TUNNELS, MPLS-LDP, and MPLS-CR-LDP (constraint routing). The method of the present invention will be described herein with respect to MPLS-LDP, but is equally applicable to other protocols that wish to set up loop-free MPLS trees, particularly the reservations (RSVP) protocol and the multicast routing protocol (MRP).

Figure 2:
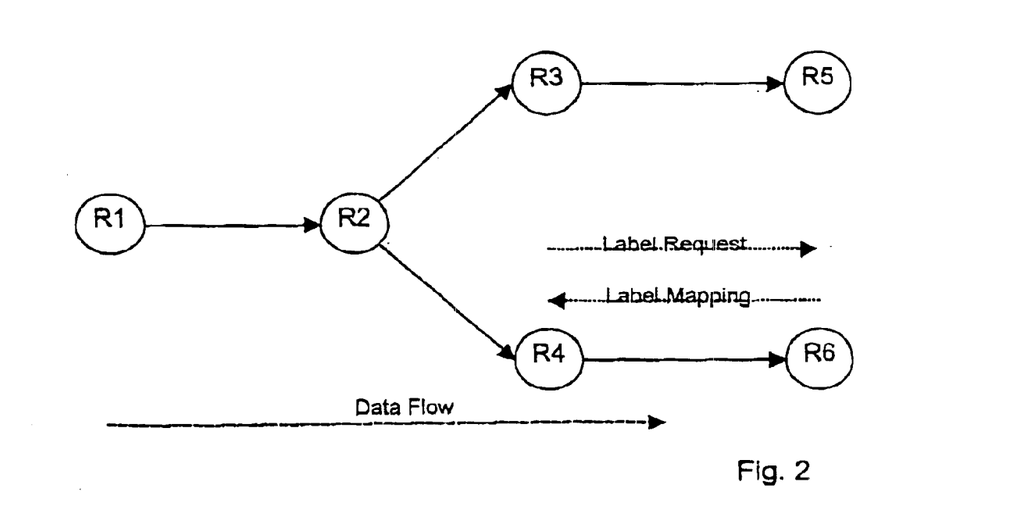
FIG. 2 is a schematic representation of a multipoint to point tree.
Figure 3:
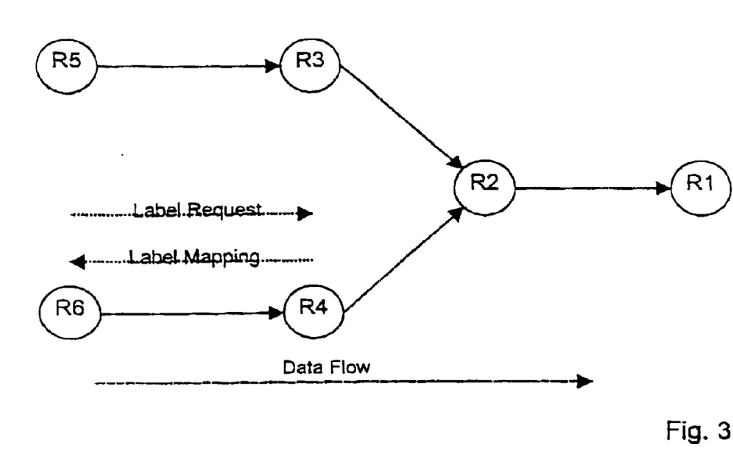
FIG. 3 is a schematic representation of a point to multi-point tree.

Examples of MPLS trees are illustrated in FIGS. 2 and 3. When unicast flows are aggregated towards an egress LSR, a MPLS multipoint to point (mp2p) tree is set up. A MPLS-(mp2p) tree is shown in FIG. 3 where R4 is the downstream router (Rd) and R6 is the upstream router Ru.

Conversely, when multicast flows are distributed from an ingress LSR, a MPLS-(p2 mp) or point-to-multipoint tree, as shown in FIG. 2, is set up. In this case, R4 is the upstream router and R6 is the downstream router.

A multicast tree may be a source tree, a unidirectional shared tree, or a bidirectional shared tree. In the case of a source tree, the root of the MPLS tree is the ingress LSR of the source tree.

In the case of a unidirectional shared tree, the root of the MPLS tree is either the core node (such as a Rendezvous Point in -protocol independent multicast sparse modes PIM-SM), or the ingress LSR of the MPLS tree, if the core node is not included in the MPLS tree.

In the case of bidirectional shared (multicast) trees, data flows towards R1 as well as away from R1. In the case of a bidirectional shared tree, such as a core based tree (CBT), the root of the MPLS tree is either the core node (the CBT core node), or the LSR that is nearest to the core node, if the core node is not included in the MPLS tree.

Figure 4:
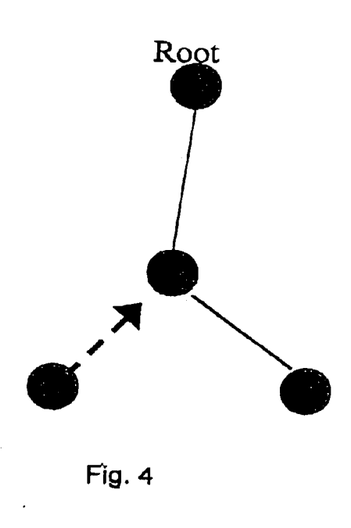
Figure 5:
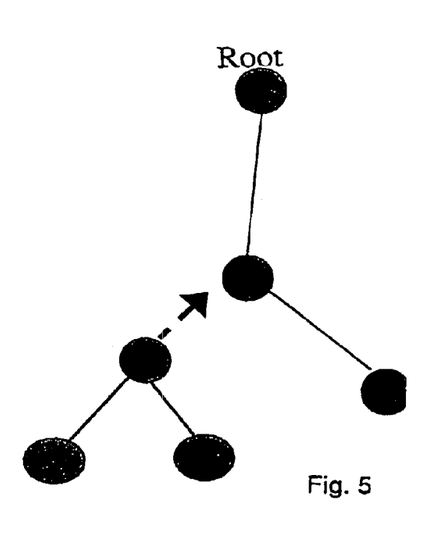
FIG. 5 illustrates the grafting of a subtree to a MPLS tree.

A label switched path is a sequence of label switching routers (LSRs) U is and the particular FEC, as it travels from hop to hop toward its destination. Generally, a label switching router (LSR) is attached to a MPLS tree after receiving a label mapping message from a member downstream neighbouring node. There are two distinct cases to consider: (a) attaching a single node to a tree as illustrated in FIG. 4; and
(b) attaching a sub-tree, to another tree as illustrated in FIG. 5.

It is to be noted that when grafting a subtree to a MPLS tree, the "loop avoidance mechanism" has to be invoked. Regardless of whether it is unicast or multicast labeled switched path, grafting a node or a subtree to a MPLS tree has to be done without causing routing loops in the resulting tree.

According to the present invention, when a label switching router (LSR) is to be attached to a MPLS tree, the label switched path to the root of the MPLS tree is verified to be loop free before a label switched path is spliced with another label switched path. Avoiding loops according to the invention is performed independent of the direction of flow and the type of MPLS tree. Due to the label setup procedure, the role of the downstream and upstream LSR is reversed for the types of MPLS trees illustrated in FIGS. 2 and 3.

Upon either receiving (mp2p tree) or before sending (p2 mp tree) a label mapping which has no binding yet, a label switching router Rx would verify whether there is a joining node or subtree. There is a node, the label is accepted.

Figure 6:
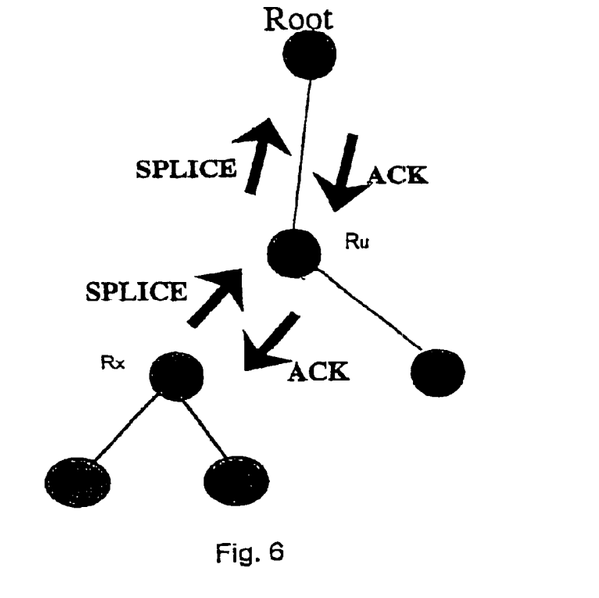
FIG. 6 illustrates loop avoidance mechanism for splicing subtrees using label splice and the acknowledgement messages, according to the invention.

As shown in FIG. 6, if it is a subtree Rx sends a label SPLICE message (Lsm) towards the ROOT. Lsm reaches an upstream node Ru which sends a splice acknowledgment message (ACK) back to Rx. When ACK message is received the subtree can be grafted to the MPLS tree. The Lsm is forwarded towards the root of the MPLS tree, which is the egress LSR for (mp2p) and the ingress LSR for (p2mp), along the already labeled path. The last LAR (Ru) on the already established label switched path will send a label splice acknowledgment message (ACK) back on the same path the label splice message was sent. Once Rx receives the ACK, the label mapping is accepted (mp2p tree) or sent (p2 mp tree). In other words, the sub-tree will be spliced with the tree.

Figure 7:
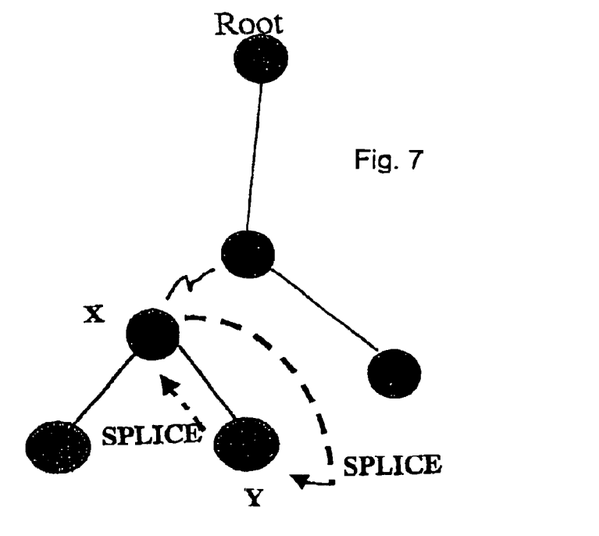
FIG. 7 illustrates the loop avoidance mechanism for splicing nodes, according to the invention.

As illustrated in FIG. 7, if a Rx receives a label slice message from Ry and it already has a pending splice message, Ry knows there is a possibility of loop forming and takes appropriate action so that Rx does not receive the ACK, thereby preventing a looping label switched path from being established.

As mentioned before, Rx is the upstream router (Ru) for the MPLS (mp2p) tree case. For the MPLS (p2 mp) tree, Rx is the downstream router (Rd). When node Rx decides to attach to the MPLS tree, Rx sends a label splice message (Lsm).

Rx can infer from the forwarding equivalence class (unicast, or multicast address) the type of tree, i.e. (mp2p) tree or (p2 mp) tree, it will be attaching to. If a node has no outstanding label splice message (Lsm) on the established path, then a node is in state "no splice". If a node in state "no splice" either starts to originate a label splice message or forwards a received label splice message, then the state changes to "splicing".

Figure 8:
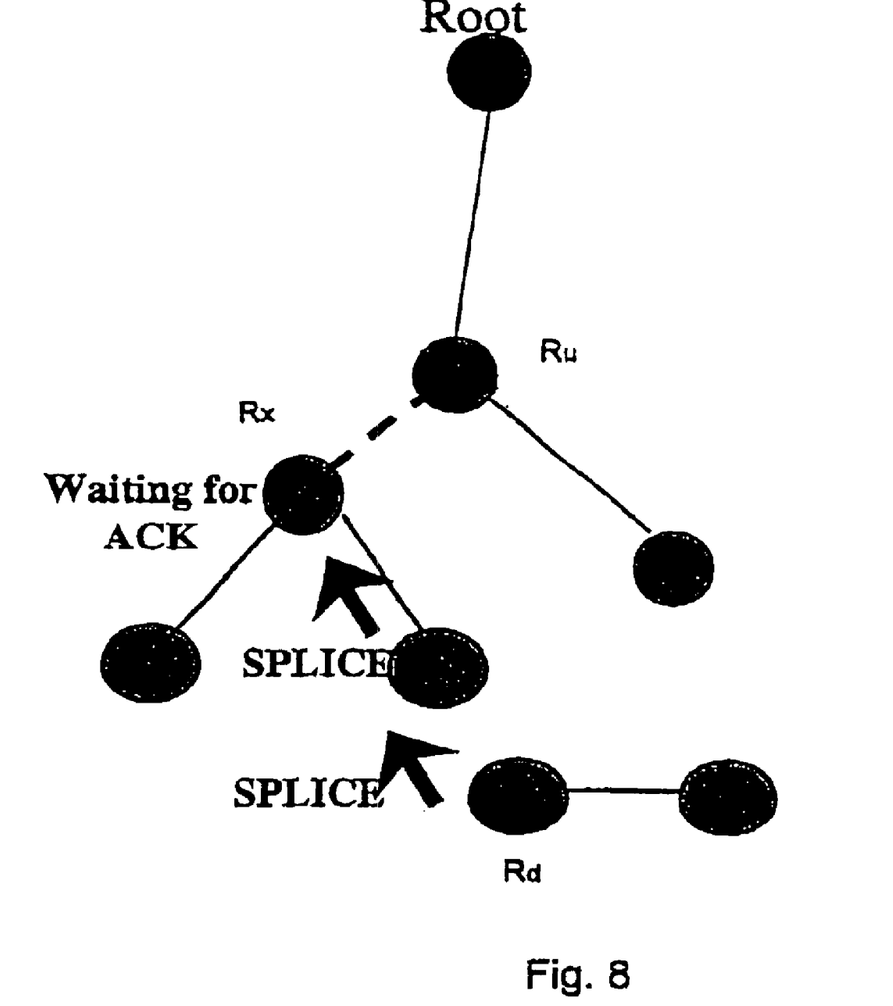
FIG. 8 illustrates loop avoidance for splicing a node with a member node waiting to receive an acknowledgement message to a previous transmitted label splice message, according to the invention.

If while waiting for ACK message to return from Ru, node Rx receives a new label SPLICE message for example from node Rd, the new SPLICE is merged with the previous SPLICE, as illustrated in FIG. 8.

If a node in state "splicing" receives a label splice message, the splice message is merged and the state changes to "merging splice". If a node in state "merging splice" receives a label splice message, the splice message is merged and the state does not change. It a node which is in state "splicing" receives an ACK, an ACK is returned to all the neighbors waiting for an ACK and the state changes to "no splice".

If a node which is in state "merging splice" receives an ACK, it sends a new label splice message (Lsm) and the stale changes to "splicing".

If a node is in state "splicing" or "merging splice", and if the next hop towards the root changes, or if the ACK from the root gets lost, it immediately returns an ACK for each neighbor waiting for an ACK.

If the node becomes a new splicing point as a result of a change in the next hop towards the root, it should send a new splice message to the new next hop.

The above procedures are only necessary for merging label switching routers (LSRs) since labeled paths are never merged (spliced) by non-merging LSRs. Hence non-merging LSRs does not cause data to loop. A different label mapping is returned for each label requested, i.e. the labels are not merged.

There is a case in which a node In state "splicing" or "merging splice" receives an ACK which does not correspond to the latest splice message. In order to distinguish the latest ACK from old ones, each splice message contains a message identifier which is assigned by each node when the message is forwarded, and each ACK carries the message identifier contained in the corresponding splice message. In the case of LDP, the 32-bit Message ID field can be used for this purpose. Only the ACK for the latest splice message is treated as the valid one.

A merging label switching router (Lsm) will not forward label request messages if there is already a pending label request for that FEC, but instead will, attempt to merge the request once it receives the corresponding label mapping (in this case it will not receive the label mapping since the request message is looping). Hence a merging LSR will not cause a label request message to loop.

A non-merging LSR, however does not merge the label request message. It will provide a different label mapping for every label request message it receives and forward the label request to the egress router. Hence if there is a routing loop, a request message may loop indefinitely.

Looping control messages are less a threat compared to looping data packets. The LDP provides a mechanism to detect looping data packets and they should be adequate to deal with looping control messages as well.

The MPLS architecture allows labels to be used for data before the label switched paths have been completely setup. Ideally, labels should be used for multicast data forwarding only after the branch of a label switched path has been completely setup to reduce the effects of incorrectly labeled packets from being multicasted in a network.

Note that the Label Splice Mechanisms, however, are orthogonal to whether LSRs are using an independent control mode where labels can be used for data before the label switched paths have been completely setup, or an ordered control made where a label is not distributed and used until an LSR receives the label mapping/binding for the corresponding FEC from its next hop.

Figure 9:
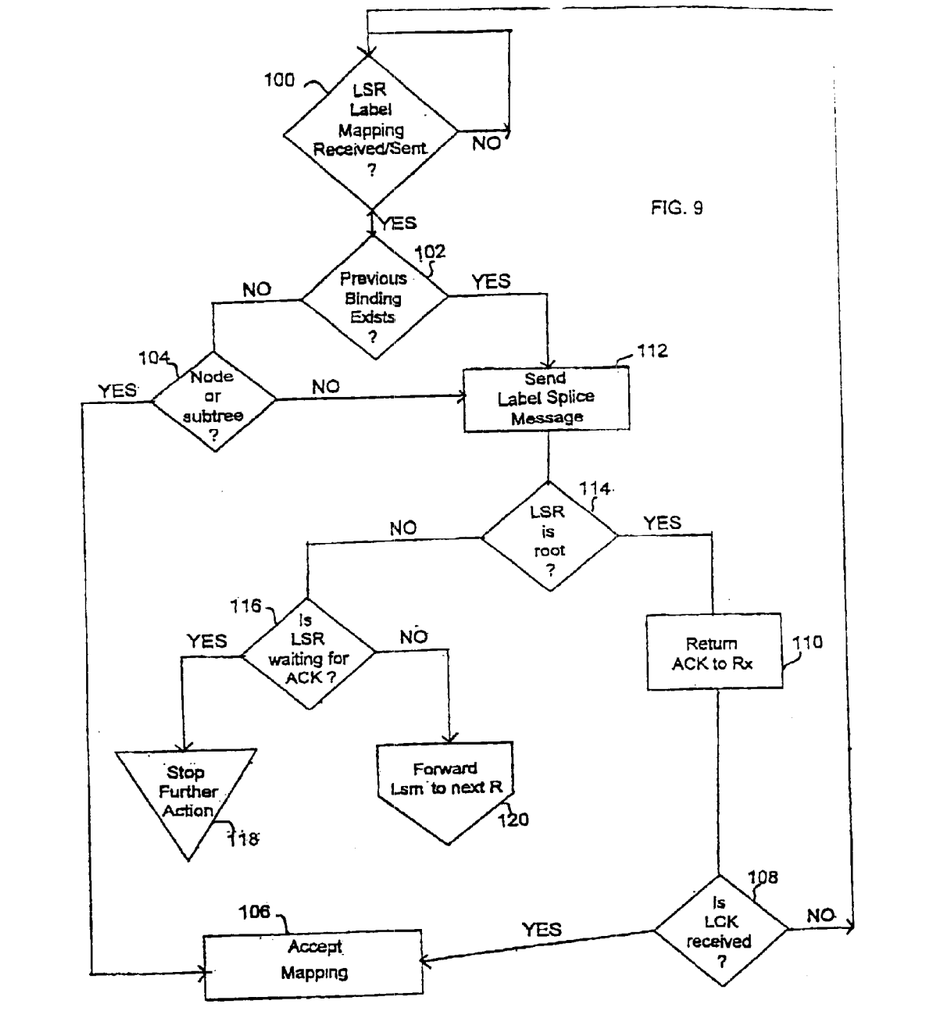
FIG. 9 is a flow chart illustrating the loop avoidance mechanism according to the invention.

The method of the present invention is illustrated in the flow chart of FIG. 9. The method does not depend on the direction of data flow, or the type of multi-protocol label switching tree. However, the loop avoidance method will be described in terms of the label setup procedure and it is noted that the role of the downstream and upstream label switching router in the scheme is reversed for each type (p2mp or mp2p) of MPLS tree.

Initially, at step 100, the label switching router in a MPLS tree receives (mp2p) or sends (p2 mp) a label mapping for a particular FEC. This indicates that a new node is to be attached to the MPLS tree. The label switching router (LSR) then detects, at step 102, whether or not it has a previous binding for the requested forwarding equivalence class (FEC).

At step 104, the node determines whether a single node or a subtree is to be attached. If a single node, and the mapping will be for a label for which the LSR has no previous binding, the LSR accepts the label mapping, at step 106, and receives it if (mp2p) or sends it if (p2 mp), as appropriate.

This event can be preceded by upstream router Ru sending a label request to downstream router Rd, as, for example, when Ru initially attempts to set up a label switched path in the egress direction. When a label switched router LSR in a MPLS tree determines that it has no previous binding for a particular forwarding equivalence class (FEC), the label mapping is accepted (mp2 mp) orient (p2 mp) and no additional new actions are needed.

However, if at step 102, the label switching router determines that it has a previous binding for the forwarding equivalence class (FEC), it sends a "label splice message" towards the root of the MPLS tree, at step 112. In the event when a label switching router LSR receives (mp2p tree), or sends (p2 mp tree) a label mapping for a label for which it already has binding this event may also be preceded by Ru sending a label request to Rd. This may happen when the next hop towards the root changes, i.e., when the Reverse Path Forwarding neighbor changes in the case of multicast or when the forwarding equivalence class (FEC) next hop changes in the case of unicast.

At step 114, it is determined if the LAR is a root-LAR or not. At step 116, it is determined if the LAR is awaiting for an ACK message. If the LAR has not received the ACK message and is awaiting a previous ACK message, then all further actions are terminated, step 118, for avoiding routing loops to be formed in the process. If the LAR has not yet received the ACK message but is not waiting for a previous ACK message, step 120, the label splice message (Lsm) is forwarded to the next LAR.

If at step 114, it is determined that the LAR is not the root-node, the ACK message is returned to Rx, step 110, and when received at step 108, the mapping is accepted. If the ACK message is never received at Rx, the process returns to step 100.

The loop avoidance mechanism according to the invention, is simple and reliable, requiring less processing compared to prior art loop prevention mechanisms. It can be used with any routing protocol for avoiding loops when constructing point-to-point (p2p), (p2 mp), and (mp2p) MPLS trees. Advantageously, the mechanism of the invention separates the loop-free path verification from the path setup process.

The method of loop avoidance according to the invention is simpler than the colored thread algorithm. The prevention of label request message looping functionality is performed through the LDP functionalities which already has a method to prevent label request message looping, when the present invention is used in conjunction with the LDP loop detection mechanism. Due to the separation the of label mapping phase from the label splicing phase, in some cases more messages would be required than the colored thread algorithm when a route changes. However, the cost would be acceptable, since the label splice messages are always forwarded toward the root of the tree regardless of whether MPLS tree is (p2 mp) or (mp2p) and can be merged at each branch of the MPLS tree.

Due to the fact that the label splicing (Lsm) message itself has no special information for loop prevention other than the FEC and the label, the method according to the invention does not have a functionality to explicitly "detecting" label switched path loops. However, the main objective of loop prevention in the present invention is not to detect an label switched path loop, but to prevent an label switched path from forming a loop at the time the MPLS tree is constructed.

When the present invention is used in conjunction with the LDP loop detection mechanism, some LSRs are performing the loop avoidance method while other LSRs are performing conventional loop detection based on path vectors.

Suppose that Ru and Rd are LDP peers, and Ru and Rd are performing the loop prevention and loop detection, respectively. Ru never sends a label splicing message to Ru. On the other hand, Ru may receive a label mapping message with a path vector but without a hop count from Rd. If Ru does not forward the label mapping message including a path vector to upstream label switching routers, there is a possibility of forming an label switched path loop since the information needed for loop detection is completely lost.

In order to avoid this kind of interoperability problem, a LSR which performs the proposed loop avoidance scheme must also performs the procedures required for the LDP loop detection when it receives a label request or label mapping message containing a path vector.

When a LSR receives a label request message with a path vector, it adds its own address to the path vector and forwards the label request message with the path vector to the downstream LSR, unless loping request message is detected.

On the other hand, when a LSR receives a label mapping message with a path vector, it adds its own address to the path vector and forward the label mapping message with the path vector to each of the upstream label switching routers, unless a label switched path loop is detected. The LSR may also originate a label splicing message as a result of receiving/sending the label mapping message. In this case, label switching between incoming and outgoing labels is kept pending until it receives an ACK for the label splice message (Lsm).

If an label switching router Rd performing the proposed loop avoidance scheme receives a label splice message (Lsm) from Ru and the next hop label switching router (LSR) to the root of the MPLS tree is not performing the proposed loop avoidance scheme, Rd should immediately return an ACK to Ru instead of forwarding the label splice message further.

The new LDP TLVs (Type, Length, Value) required for the Label Splice Message contains the Label Splice Message type, the message length, message ID, the address of the label switching router which originates the splice message, the FEC TLV and the Label TLV.

The Label Splice Acknowledgment Message contains the Label Splice Acknowledgment Message type, the message length, message ID, the address of the LSR which originates the splice message, the FEC TLV and the Label TLV.

Some changes in LDP Common Session Parameters TLV are necessary. A new one-bit field is defined in Common Session Parameters TLV as "P" for indicating whether loop prevention is enabled. A value of 0 means loop prevention is disabled; a value of 1 means that loop prevention is enabled. When P-bit Is set to 1, D-bit must also be set to 1. No label splice message is sent to an LDP peer from which a Common Session Parameters TLV is received with P-bit= 0.

The above-described embodiments of the invention are intended to be examples of the present invention and alterations and modifications may be effected thereto, by those of skill in the art, without departing from the scope of the invention which is defined solely by the claims appended hereto.

We claim:

1. A method for preventing routing loop from forming when joining a node to a Multi-Protocol Label Switching tree, comprising the steps of:
   a) obtaining at a label switching router (LSR) a label mapping for a forwarding equivalency class (FEC);
   b) determining if previous bindings exist for said FEC:
   c) determining if said joining node is a signal node or a parent node of a subtree;
   d) accepting the mapping for said single node if no previous bindings exist; and
   if said previous bindings exist when said subtree is attached to said Multi-Protocol Label Switching tree:
   e) sending a label splice message (Lsm) from said LSR to a root-node on a label switched path and returning a label splice message acknowledgement (ACK) to said LSR, and
   f) accepting the mapping after receiving said ACK at said LSR;
   g) terminating any further action if said LSR is waiting for a previous ACK message,
   h) forwarding said Lsm to the next LSR if said LSR is not waiting for said previous ACK message.

2. A method for avoiding routing loops from forming when a node of a subtree is grafted to a Multi-Protocol Label Switching tree, comprising the steps of:
   a) receiving a label binding Message at said node, said label binding including a label and a forwarding equivalency class (FEC):
   b) if a label mapping request for the same FEC was not previously received at said node sending a label splice message (Lsm) towards the root of said Multi-Protocol Label Switching tree along a labelled path;
   c) generating a splice acknowledgement message (ACK) by said root node in response to said Lsm;
   d) declaring loop-free and accepting said binding if said node is not waiting for a previous ACK corresponding to a previously received Lsm and said ACK returns to said node on the same said labelled path; and
   e) informing all member nodes said subtree was grafted to said Multi-Protocol Label Switching tree.

3. The method of claim 2, wherein said Multi-Protocol Label Switching tree comprises a unidirectional shared tree.

4. The method of claim 3, wherein said root of said unidirectional shared tree comprises an ingress node of said unidirectional shared tree if the core node is not included in said unidirectional shared tree.

5. The method of claim 2, wherein said Multi-Protocol Label Switching tree comprises a source tree.

6. The method of claim 5, wherein said root of said source tree comprise and ingress node of said source tree.

7. The method of claim 2, wherein said Multi-Protocol Label Switching tree comprises a bidirectional shared tree.

8. The method of claim 7, wherein said root of said bidirectional shared tree comprises the node closest to the core if said care node is not included in said bidirectional shared tree.

9. The method of claim 2, wherein said Multi-Protocol Label Switching tree comprises a multipoint to point tree.

10. The method of claim 2, wherein said Multi-Protocol Label Switching tree comprises a point to multipoint tree.

11. The method of claim 2, wherein whenever there is a label mapping request for same said FEC at said node, the following substeps are performed after step (a):
   merging label mapping requests; and
   stop forwarding said Lsm.

12. The method of claim 2, wherein, if said ACK is not received back by said node while said nod is waiting to receive said previous ACK, terminating grafting procedures after performing step (c).

13. The method of claim 2, wherein, if said ACK is not received back by said node and said node is not waiting to receive said previous ACK, forwarding said Lsm after performing step (c).

14. The method of claim 2, wherein said label splice message contains a message identifier and the address of a node which originates said label splice message, and said generating step generates the spice acknowledgement message having the message identifier and the address contained in the corresponding label splice message.

15. The method of claim 14, further comprising the step of distinguishing a latest splice acknowledgement message from a previous splice acknowledgement message based on each massage identifier.

16. A method for preventing rooting loops from forming when splicing subtree with a Multi-Protocol Label Switching tree, comprising the steps of:
   obtaining at a label switching router (LSR) a label mapping for a forwarding equivalency class (FEC):
   determining if previous bindings exist for said FEC:
   if said previous bindings exist, sending a label splice message from said LSR to a root-node on a label switched path;
   returning a label splice message acknowledgment to said LSR on the same label switched path in response to the label spice message:
   said sending step includes the step of forwarding said label splice message to a next LSR when not waiting for a previous label splice acknowledge message from said root-node and terminating any further action when waiting for said previous label splice acknowledge message; and splicing, said subtree with said Multi-Protocol Label Switching tree when said label switching router originating said label splice message receives said label splice acknowledgement message.

17. The method of claim 16, wherein said splicing step includes the step of sending said label mapping when splicing a node of said subtree with a Multi-Protocol Label Switching point to multipoint tree (p2mp).

18. The method of claim 16, wherein said splicing step includes the step of accepting said label mapping when splicing a node of said subtree with a Multi-Protocol Label Switching multipoint to point tree (mp2p).

19. The method of claim 16, wherein said label splice message contains a message identifier and the address of a node which originates said label splice message, and said generating step generates the splice acknowledgement message having the message identifier and the address contained in the corresponding label splice message.

20. The method of claim 19, further comprising the step of distinguishing a latest splice acknowledgement message from a previous splice acknowledgement message based on each message identifier.

* * * * *